April 18, 1961    G. SELWOOD    2,980,137
FLUID CONTROL VALVES HAVING RECTILINEARLY
SLIDABLE PARTS WITHIN PORTED
HOLLOW BODIES
Filed Nov. 23, 1959

Inventor
G. Selwood
By Hancock Downing Seebold
Attys.

United States Patent Office 2,980,137
Patented Apr. 18, 1961

2,980,137

FLUID CONTROL VALVES HAVING RECTILINEARLY SLIDABLE PARTS WITHIN PORTED HOLLOW BODIES

George Selwood, Taunton, Somerset, England, assignor to Wilmot-Breeden Limited, Bridgwater, England Filed Nov. 23, 1959, Ser. No. 854,913

Claims priority, application Great Britain Nov. 27, 1958

1 Claim. (Cl. 137—622)

This invention relates to slide valves of the kind comprising a valve body having formed therein at least one inlet port and one outlet port, and a member slidable within the body and having formed therein a passage or passages through which communication can be established between the inlet and outlet ports.

The object of the invention is to provide such a valve in a convenient form and which can be utilised for controlling fluids at pressures which are high in relation to the power available for actuating the valve.

According to the invention in a valve of the kind specified the member is mounted for sliding movement within the valve body by means of anti-friction ball or roller bearings whereby a predetermined clearance is maintained between the member and body at all settings of the valve.

Figure 1:
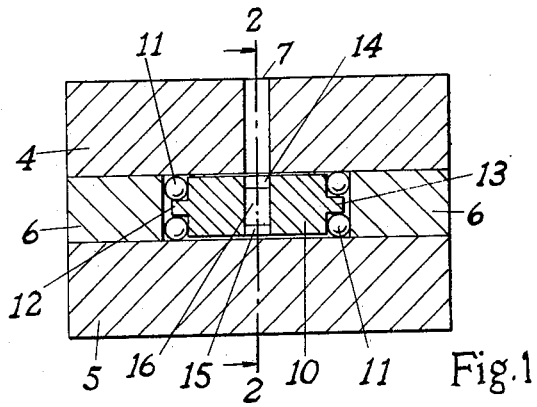
Figure 2:
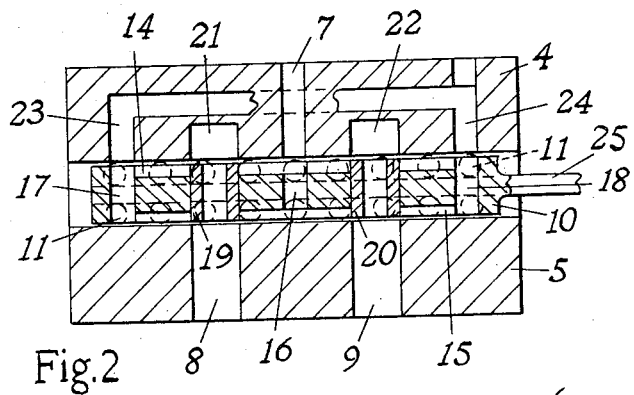
Figure 3:
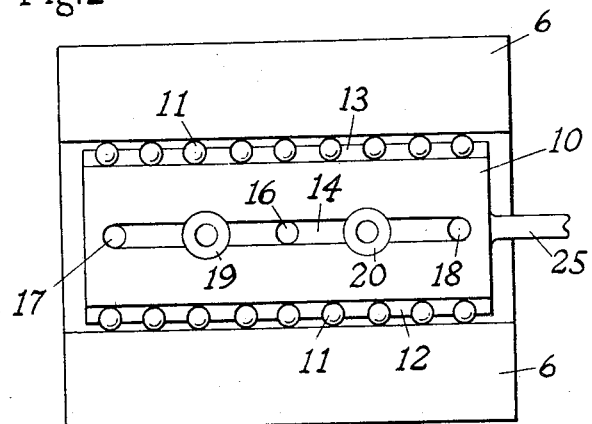

An example of the invention is illustrated in the accompanying drawings, in which Figure 1 is a sectional end view, Figure 2 is a section on the line 2—2 in Figure 1, and Figure 3 is a plan with the upper end part removed.

Referring to the drawings, there is provided a valve body which is formed from a pair of separate end parts 4, 5, the presented faces of which are accurately machined and are spaced apart by intermediate parts 6 which will maintain them in accurate parallel relationship. Moreover, the presented faces of the part 6 are accurately machined and lie in spaced parallel relationship. In the end part 4 is an inlet 7 and in the part 5 are a pair of spaced ports 8, 9 which may, for example, be in communication with a reversible motor.

Within the space defined between the parts 4, 5, 6, is mounted a slidable valve member 10. The end faces of the member 10 adjacent the presented faces of the parts 4, 5 are accurately machined so as to be parallel thereto and to provide small predetermined clearances therebetween. Moreover, the member 10 is mounted for sliding movement within the body by anti-friction bearings in the form of balls 11 or rollers accommodated in two pairs of parallel apertures. One pair of apertures is defined by the member 10, ribs 12, 13 formed thereon, and the parts 4, 6. The other pair of apertures are defined by the member 10, the ribs 12, 13 and the parts 5, 6. The arrangement is such that the anti-friction balls 11 or rollers serve to guide the member 10 during sliding movement and at the same time maintain the aforementioned predetermined clearances.

In one end face of the member 10 is a groove 14 which communicates with the inlet 7, and in the opposite face of the member 10 is a similar groove 15 which can be placed in communication with either of the ports 8, 9. The grooves 14, 15 are in communication with each other through a central passage 16 and a further pair of passages 17, 18. Moreover, accommodated within a further pair of passages between the passage 16 and the passages 17, 18 are a pair of annular sleeves 19, 20 which in the position shown prevent communication between the groove 15 and the ports 8, 9.

Within the part 4 at positions opposite the ports 8, 9 respectively are formed a pair of blind bores 21, 22, which equalise the pressure on each side of the member 10. Moreover, a pair of exhaust passages 23, 24 are formed in the part 4, these passages communicating with the passages 17, 18 respectively.

The member 10 is movable by a spindle 25 extending through the part 6 and the arrangement is such that in the position shown there is no flow to the motor. However, when the member 10 is moved to the right from the position shown in Figure 2 fluid flows from the inlet 7 through the port 9 to the motor by way of the passage 16 and groove 15, and also by way of the groove 14, bore 22 and the passage containing the sleeve 20. The exhaust from the motor flows through the port 8 to the passage 23, by way of the groove 15 and passage 17, and also by way of the passage containing the sleeve 19, the bore 21, and the groove 14. When the member 10 is moved to the left from the position shown in Figure 2 fluid flows through the port 8 to drive the motor in the opposite direction. In this case the exhaust flows through the port 9 to the passage 24.

By the present invention, since the anti-friction bearings will at all times maintain predetermined clearances between the valve member and the body, and any out-of-balance forces resulting from the fluid pressure will re-act upon the anti-friction bearings, the valve can be utilised for controlling fluid at pressures which are high in relation to the power available for actuating the valve.

Having thus described my invention what I claim as new and desire to secure by Letters Patent is:

A fluid control valve of the kind specified, comprising in combination a hollow body provided with inlet and outlet ports, and with a pair of parallel internal surfaces in spaced relationship, a rectilinear member which has formed therein at least one passage, and which is mounted within the hollow body between the said parallel internal surfaces thereof so as to be rectilinearly slidable for controlling fluid flow through the inlet and outlet ports, an actuating member united with the rectilinear member and extending from one end thereof through the corresponding part of the hollow body, the rectilinear member having a pair of parallel faces separated from the said parallel internal surfaces of the hollow body by small predetermined clearances, and two pairs of straight rows of anti-friction bearing members situated within the hollow body between, and in contact with, the rectilinear member and the said parallel internal surfaces of the hollow body to support the rectilinear member and maintain the small predetermined clearances between the parallel faces of the rectilinear member and the said parallel internal surfaces of the hollow body.

References Cited in the file of this patent

UNITED STATES PATENTS

| | | |
|---|---|---|
| 2,349,641 | Tucker et al. | May 23, 1944 |
| 2,865,215 | Bishop | Dec. 23, 1958 |
| 2,875,782 | Shik-Ying Lee | Mar. 3, 1959 |

FOREIGN PATENTS

| | | |
|---|---|---|
| 731,881 | Great Britain | June 15, 1955 |